(12) United States Patent
Enzaldo et al.

(10) Patent No.: US 10,565,592 B2
(45) Date of Patent: *Feb. 18, 2020

(54) RISK ANALYSIS OF MONEY TRANSFER TRANSACTIONS

(71) Applicant: The Western Union Company, Englewood, CO (US)

(72) Inventors: Robert Enzaldo, Littleton, CO (US); Alec Hall, Littleton, CO (US); Alexander Varaken, Parsippany, NJ (US); Bryant Gofstein, Highlands Ranch, CO (US); Hiran Modi, Middletown, NJ (US); Hollis Baugh, Littleton, CO (US); Niren Kinikar, Monmouth Junction, NJ (US); Noel Brandt, Highlands Ranch, CO (US); Viren Patel, Parsippany, NJ (US)

(73) Assignee: The Western Union Company, Denver, CO (US)

( * ) Notice: Subject to any disclaimer, the term of this patent is extended or adjusted under 35 U.S.C. 154(b) by 289 days.

This patent is subject to a terminal disclaimer.

(21) Appl. No.: 13/952,775

(22) Filed: Jul. 29, 2013

(65) Prior Publication Data

US 2013/0346287 A1    Dec. 26, 2013

Related U.S. Application Data

(63) Continuation of application No. 13/337,512, filed on Dec. 27, 2011, now Pat. No. 8,527,418.

(Continued)

(51) Int. Cl.
*G06Q 40/02* (2012.01)
*G06Q 20/40* (2012.01)
*G06Q 20/10* (2012.01)

(52) U.S. Cl.
CPC ......... *G06Q 20/4016* (2013.01); *G06Q 20/10* (2013.01); *G06Q 40/02* (2013.01)

(58) Field of Classification Search
CPC ........ G06Q 10/00; G06Q 20/00; G06Q 30/00; G06Q 40/00
(Continued)

(56) References Cited

U.S. PATENT DOCUMENTS 7,798,397 B2 *  9/2010  Henry et al. .................. 235/379
7,801,811 B1     9/2010  Merrell et al.
(Continued)

OTHER PUBLICATIONS

Jung et al., "Risk Analysis for Electronic Commerce Using Case-Based Reasoning", Korea Advanced Institute of Science and Technology, Seoul, Korea. (Year: 1998).*
(Continued)

*Primary Examiner* — Frantzy Poinvil
(74) *Attorney, Agent, or Firm* — Kilpatrick Townsend & Stockton LLP

(57) ABSTRACT

A money transfer system includes a risk assessment system and a risk modeling system. The risk assessment system uses rules engines and Z scores to assess, on a real time basis, risk factors associated with money transfers. The risk modeling system develops risk scores based on historical transaction data in order to create a risk model. The risk model may be analyzed over time to refine the rules engines and take other actions to understand and reduce the risk of improper activity in connection with money transfers.

6 Claims, 13 Drawing Sheets

Related U.S. Application Data

(60) Provisional application No. 61/562,882, filed on Nov. 22, 2011.

(58) Field of Classification Search
USPC .................................................. 705/3–44
See application file for complete search history.

(56) References Cited

U.S. PATENT DOCUMENTS

| | | | |
|---|---|---|---|
| 7,844,545 B2 * | 11/2010 | Michelsen | G06Q 30/06 705/39 |
| 7,878,393 B2 * | 2/2011 | Henry | 235/379 |
| 7,930,216 B2 * | 4/2011 | Neofytides et al. | 705/26.41 |
| 7,949,600 B1 * | 5/2011 | Portillo et al. | 705/39 |
| 7,970,701 B2 * | 6/2011 | Lewis et al. | 705/38 |
| 7,984,500 B1 * | 7/2011 | Khanna et al. | 726/22 |
| 8,028,901 B2 * | 10/2011 | Henry et al. | 235/379 |
| 8,082,210 B2 * | 12/2011 | Hansen et al. | 705/39 |
| 8,082,349 B1 * | 12/2011 | Bhargava et al. | 709/227 |
| 8,145,562 B2 * | 3/2012 | Wasserblat et al. | 705/38 |
| 8,185,457 B1 | 5/2012 | Bear et al. | |
| 8,239,677 B2 | 8/2012 | Colson | |
| 8,260,798 B2 * | 9/2012 | Schrock | G06F 16/119 707/758 |
| 8,412,605 B2 | 4/2013 | Griffin et al. | |
| 8,725,562 B2 * | 5/2014 | Song | G06Q 30/02 705/14.25 |
| 8,739,278 B2 * | 5/2014 | Varghese | G06F 21/31 726/22 |
| 9,047,708 B2 * | 6/2015 | Kalpin | A61B 17/3403 |
| 9,160,726 B1 * | 10/2015 | Kaufman | H04L 63/08 |
| 2008/0046334 A1 | 2/2008 | Lee et al. | |
| 2008/0301040 A1 | 12/2008 | Knudson et al. | |

OTHER PUBLICATIONS

Norman et al., "A Risk-based methodology for payment systems oversight", Payments & Infrastructure Division, Bank of England, Threadneedle Street, London EC2R 8AH, UK. Tel: + 44(0)20 7601 3929 (Year: 2009).*

* cited by examiner

{ To Fig. 9b

| Agent ID | City | State | Country | SAR'd Txns | Z-Score | SAR'd Amount | Z-Score | Investigation Findings | Z-Score | Avg Send Txn | Z-Score |
|---|---|---|---|---|---|---|---|---|---|---|---|
| Agent 123 | CITYA | CA | US | 137 | 2.54 | $284,610 | 3.57 | 6 | 4.85 | $1,105 | 0.16 |
| Agent 124 | CITYB | CA | US | 118 | 2.15 | $230,558 | 2.82 | 5 | 3.92 | $1,161 | 0.41 |
| Agent 125 | CITYC | CA | US | 68 | 1.11 | $166,907 | 1.93 | 1 | 0.19 | $1,113 | 0.20 |
| Agent 126 | CITYD | CA | US | 11 | -0.07 | $42,704 | 0.20 | 3 | 2.05 | $964 | -0.45 |
| Agent 127 | CITYE | CA | US | 185 | 3.54 | $307,532 | 3.89 | 3 | 2.05 | $1,004 | -0.28 |
| Agent 128 | CITYF | CA | US | 25 | 0.22 | $100,516 | 1.01 | 1 | 0.19 | $1,752 | 2.99 |
| Agent 129 | CITYG | CA | US | 80 | 1.36 | $260,572 | 3.24 | 0 | -0.74 | $1,764 | 3.04 |
| Agent 130 | CITYH | CA | US | 18 | 0.07 | $30,965 | 0.04 | 1 | 0.19 | $1,348 | 1.22 |
| Agent 131 | CITYI | CA | US | 11 | -0.07 | $45,087 | 0.24 | 1 | 0.19 | $1,040 | -0.12 |
| Agent 132 | CITYJ | CA | US | 26 | 0.24 | $96,843 | 0.96 | 2 | 1.12 | $1,863 | 3.47 |

*FIG. 9a*

| Avg Pay Txn | Z-Score | Fraud Complaint Count | Z-Score | Fraud Complaint Amount | Z-Score | Composite Score | External Geo Risk Multiplier | Final Score | Overall Rank |
|---|---|---|---|---|---|---|---|---|---|
| $1,136 | -0.14 | 28 | 9.02 | $29,375 | 5.27 | 2.39 | 1.05 | 2.51 | 1 |
| $1,239 | 0.20 | 15 | 4.45 | $18,872 | 3.17 | 1.67 | 1.05 | 1.76 | 2 |
| $2,114 | 3.12 | 9 | 2.33 | $25,954 | 4.59 | 1.11 | 1.05 | 1.16 | 3 |
| $1,437 | 0.86 | 10 | 2.69 | $33,011 | 6.00 | 1.03 | 1.05 | 1.08 | 4 |
| $1,473 | 0.98 | 3 | 0.22 | $2,785 | -0.06 | 1.00 | 1.05 | 1.05 | 5 |
| $1,252 | 0.24 | 8 | 1.98 | $27,827 | 4.96 | 0.96 | 1.05 | 1.01 | 6 |
| $2,663 | 4.94 | 3 | 0.22 | $9,404 | 1.27 | 0.93 | 1.05 | 0.98 | 7 |
| $1,412 | 0.78 | 11 | 3.04 | $30,399 | 5.48 | 0.87 | 1.05 | 0.91 | 8 |
| $1,458 | 0.93 | 8 | 1.98 | $30,904 | 5.58 | 0.77 | 1.05 | 0.81 | 9 |
| $2,266 | 3.62 | 1 | -0.48 | $2,800 | -0.05 | 0.75 | 1.05 | 0.79 | 10 |

From Fig. 9a

*FIG. 9b*

| Risk Factors | Description |
| --- | --- |
| SAR'd Transaction Count | Count of transactions that appear in regulatory reports filed by Operator, by Agent |
| SAR'd Money Order (MO) Items | Count of MO Items that appear in regulatory reports filed by Operator, by Agent |
| Average Send Transaction Amount | Average send transaction amount by Agent |
| Average Pay Transaction Amount | Average pay transaction amount by Agent |
| Fraud Complaint Count | Count of transactions reported as fraud by the sender |
| Fraud Complaint Amount | Principal amount of the transactions reported as fraud by the sender |
| Send-Pay Interval Percentage | The percent of an Agent's transactions that were paid out less than 30 minutes from when they were sent |
| False ID Index | An Index which indicates the likelihood of a fallacious consumer ID numbers, especially sequential or repetitive numbers. |
| False Phone Index | An Index which indicates the likelihood of a fallacious consumer phone numbers, especially sequential or repetitive numbers. |
| ID Sharing Events | Count of events where multiple consumers share the same sender ID at the same Agent, aggregating to over $1k |
| Phone Sharing Events | Count of events where multiple consumers share the same phone number at the same Agent, aggregating to over $1k |
| Consumer Hoppers | Count of Consumers who used multiple Agents on the same day, by Agent |
| Minutes- Rapid Fire Txns | Count of transactions that are sent within 3 minutes of the previous txn, By Terminal ID, by Agent |
| FLA Transaction Surfing- Questionable Look-Ups | Count of unique transactions that have been "looked up" at more than one other Agent location before being paid out |
| Intra Txns as Pct of Total | The percent of transactions that are sent or paid Intra-Country, by Agent |
| Send-Pay Ratio (Transaction Principal) | An Agent's monthly send principal (total amounts) as a ratio of the pay principal |
| Pay-Send Ratio (Transaction Principal) | An Agent's pay principal (total amounts) as a ratio of the Agent's send principal |
| Agent Send/Pay Prinicpal | Agent monthly principal (total amounts send and paid) |
| Banded Transaction Count | Count of transactions within bands: $900-$999, $2900-$2999, $7400-$7499, $9900-$9999 |
| Banded Transaction Count vs Overall Txn Percentage | Count of banded transactions as a percent of Agent overall transaction volume |
| Flipped Transaction Count | Count of transactions where single consumer who receives a transaction and sends a transaction within a single day |
| Paid in Error Count | Count of transactions reported as paid in error |
| Paid in Error Amount | Principal amount of the transactions reported as paid in error |

*FIG. 10*

RISK ANALYSIS OF MONEY TRANSFER TRANSACTIONS

This application is a continuation of application Ser. No. 13/337,512, filed Dec. 27, 2011, now U.S. Pat. No. 8,527,418, which claims the benefit of U.S. Provisional Patent Application No. 61/562,882, filed Nov. 22, 2011, both of which are incorporated herein by reference.

BACKGROUND OF THE INVENTION

Money transfer services are widely used to transfer money and pay bills through the use of wire transfers, money orders and the like. Unlike bank account transfers, very little personal information or transaction history concerning the sender and recipient (other than identification information) is typically provided. As a result, attempts are sometimes made to use money transfers for illegal and other improper purposes, such as money laundering, payment for illicit products or services, and funding terrorist or other criminal activity.

Systems for preventing improper use of money transfers often involve developing various lists of senders, recipients, agents and countries where suspicious activity has been reported. For example, the name of a person known to be associated with money laundering may be added to a "black list," so that any future transaction to/from the same person may be flagged for review and possible rejection. In some cases, where certain countries or other geographical locations have been known to involve higher risk of illegal activity, money transfers to or from such locations can be rejected, e.g., if the amount of the transaction exceeds a specified amount. Such lists usually rely on past patterns and behaviors that have been observed, so that when the same pattern is repeated in the future, the transaction can be stopped.

Today, large money transfer services organizations can process millions of transactions a day across the world, and hundreds of thousands of those transactions will involve first time senders and recipients. Current systems that screen transactions based on senders and recipients (and their past involvement in suspicious activity) are of little use for those first time users. A new sender or recipient may conduct several suspicious transactions before enough data has been collected to cause a transaction to be flagged, and during that time improper activity has not been stopped. Additionally, relying on suspicious senders/recipients, agents, locations, and so forth, to screen transactions will often lump many transactions together as either suspicious or not, and potentially result in some legitimate transactions being rejected (or perhaps subjected to manual review before being approved) and some improper transactions slipping through the screening.

In addition, risk factors today tend to be subjective (e.g., picking a certain country and dollar amount as being either probably safe or probably not safe), and do not take full advantage of the vast amount of data that is potentially available to assess transaction risk, or to develop rules for assessing transaction risk.

BRIEF SUMMARY OF THE INVENTION

There is provided, in accordance with embodiments of the present invention, systems and methods for risk assessment of money transfer transactions.

In one embodiment, a system for conducting a consumer-based money transfer transaction is provided. Such a system typically interfaces with a transaction terminal for receiving money transfer information. The system comprises a money transfer host computer communicatively coupled to the transaction terminal for conducting the money transfer transaction, and a risk assessment system associated with the money transfer host computer for assessing on a real-time basis a risk of improper activity in connection with the money transfer transaction. The risk assessment system includes at least one rules engine for evaluating the money transfer information received at the money transfer terminal, and provides, prior to the money transfer transaction being completed at the money transfer host computer, a risk assessment of the transaction based on the evaluation of the money transfer information at the rules engine.

In another embodiment, a method for assessing risk associated with a money transfer transaction based on prior money transfer transactions comprises receiving money transfer information having a value for at least one risk factor associated with the money transfer transaction, receiving money transfer information having values for the same risk factor associated with prior money transfer transactions, providing the money transfer information to a risk assessment system, the risk assessment including one or more rules engines for assessing the risk associated with the money transfer transaction, and assigning, at the risk assessment system, a Z score to the risk factor associated with the money transfer transaction based on the formula:

$$Z = \frac{\chi - \mu}{\sigma}$$

wherein Z is the Z score;
wherein $\chi$ is the value of the data for the risk factor in the money transfer transaction;
wherein $\mu$ is a mean of values for the same risk factor in the prior money transfer transactions; and
wherein $\sigma$ is a standard deviation of values for the risk factor in prior money transfer transactions.

In another embodiment, a method for refining rules for a rules engine for use in assessing risk of improper activity associated with money transfer transactions comprises storing data for completed money transfer transactions in a data base, including data for at least one risk factor, using the stored data to develop a risk model for money transfer transactions by using the data to assign a risk score to the at least one risk factor for the completed money transfer transactions, assigning, as new money transfer transactions are completed, an updated risk score to the risk factor based on the data for the risk factor for both the past money transfer transactions and the new money transfer transactions, and using the updated risk score to refine at least one rule in the rules engine.

A more complete understanding of the present invention may be derived by referring to the detailed description of the invention and to the claims, when considered in connection with the Figures.

BRIEF DESCRIPTION OF THE DRAWINGS

FIGS. 9a and 9b illustrate data for risk factors and Z scores for ten exemplary agents.

FIG. 10 is a table of more extensive exemplary risk factors (and descriptions of each).

DETAILED DESCRIPTION OF THE INVENTION

Figure 1:
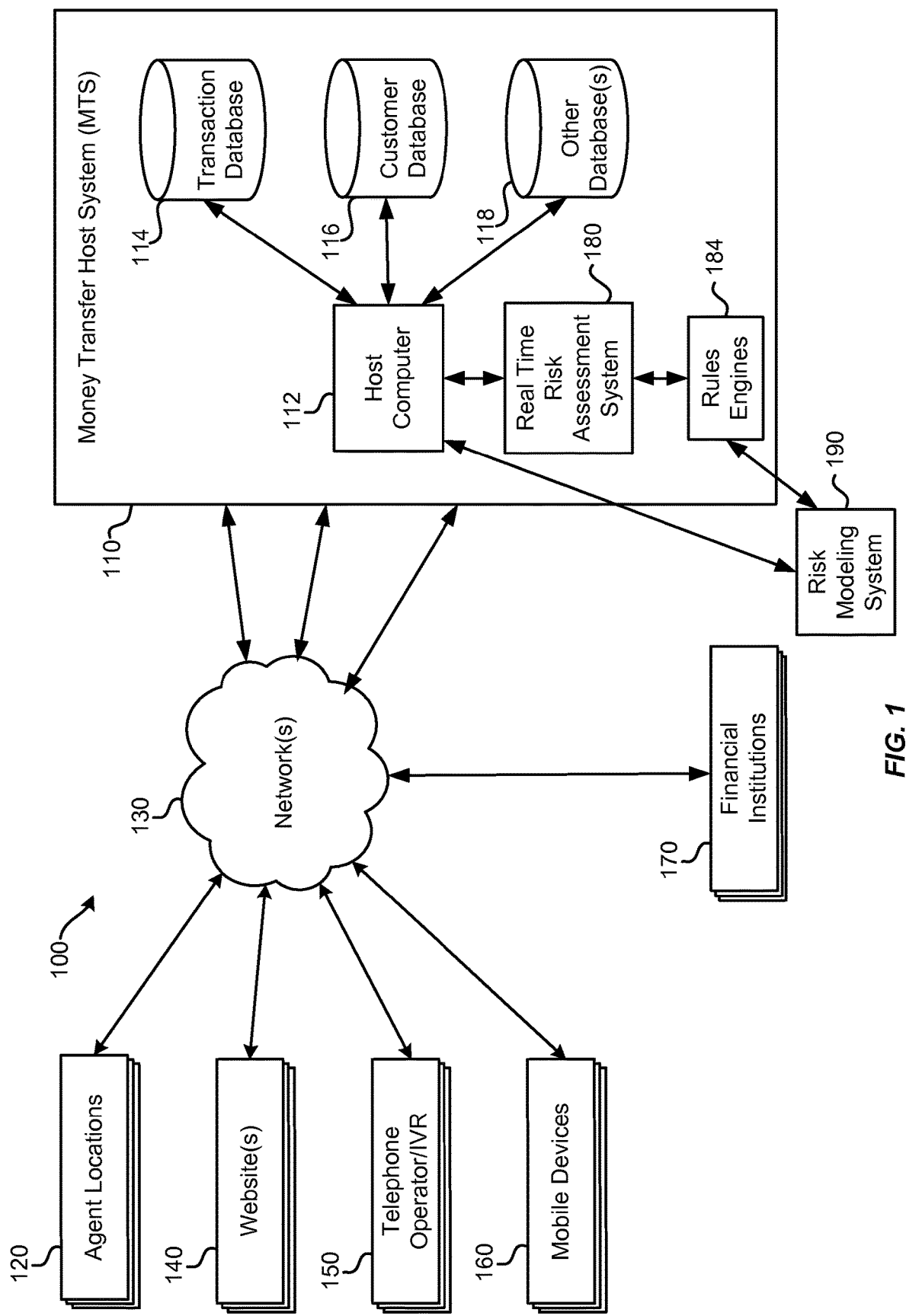
FIG. 1 is a general block diagram of a money transfer system, illustrating one embodiment of the invention.

In the following description, numerous specific details are set forth in order to provide an understanding of various embodiments of the present invention. It will be apparent, however, to one skilled in the art that embodiments of the present invention may be practiced without some of these specific details. In other instances, well-known structures and devices are shown in either block diagram form or omitted to avoid obscuring more salient features of the invention.

Generally speaking, embodiments of the present invention provide methods and systems for evaluating risk associated with money transfers.

In one embodiment, a risk assessment system is provided for assessing or evaluating risk associated with a money transfer transaction. The risk assessment is done on a real time basis while the transaction is being processed.

The risk assessment system is associated with one or more rules engines that define and apply rules to transaction data that has been entered or collected for a particular transaction, as well as other data that may be relevant to risk associated with the transaction. In some embodiments, the rules engines include a data normalization engine that normalizes data (e.g., reformats data that may come in different formats, e.g., from different systems used by different agents or agent networks), a data integrity engine that checks the data integrity (e.g., looks for data that has been improperly entered, such as a phone number with insufficient digits or an ID number with clearly erroneous or suspicious digits), and a list processing engine that compares the entered data against list of payors/payees or entities for whom transactions are restricted or to be blocked. In addition, the rules engine includes a consumer identification engine (to identify other transactions that can be linked to the same consumer, e.g., by associating similar names, addresses and other identifying data), and a business logic engine (to define standard business rules applicable to transactions, such as requiring proof of identity for any transaction over a value of, say, $3000).

In one embodiment, the rules engines also includes a data aggregation engine. Such engine includes rules that help identify and aggregate current transaction data with prior transactions that may be related. For example, data might be aggregated for the same consumer (payor/payee), for the same agent, for the same country and so forth. The current transaction can be viewed in the context of previous transactions.

The rules engines further include a risk assessment engine that evaluates the current transaction in various contexts. A score is calculated at the risk assessment engine using various data characteristics or categories (e.g., sender, recipient, agent, geographical location of party or its agent, transaction amount) of prior transactions. Thus, the risk assessment engine not only considers the transaction at hand (and the sender involved) in assessing risk, but also using one of the data categories of the transaction data (e.g., agent), could further aggregate past transactions for that agent (i.e., transactions not involving the same sender), and assesses risk factors associated with those transactions. In one example, the risk assessment engine considers the transaction at hand and its sender in assessing risk, but then also looks at an additional data category (e.g., the agent for the transaction), and aggregates all of the transactions for that agent (over a specified period of time). Risk factors for the data category (agent) are then assessed. In one exemplary embodiment, a risk factor of a number fraud complaints (reported against transactions by that agent) is also assessed and scored for the transaction at hand. As should be appreciated, multiple transaction data categories (and risk factors associated with those categories) beyond those identified could be considered in assessing the risk of the current transaction.

In one exemplary embodiment, a risk score is calculated with the use of a Z score, which is a measure of how much a value is above or below the mean of a given population. As one simple example, a current transaction for a payor may have certain transaction characteristics, say, transaction amount. Using this example, a Z-score can be calculated for how much the value of the current transaction is above the mean for all transaction over time by the same payor, or above the mean for all transactions conducted through the same agent, or above the mean for all transactions sent from a certain geographical location (e.g., city or country). The various Z scores could be weighted and combined to reflect an overall score. Similarly, as another example, Z scores could be calculated for a given agent, such as a Z score for the average transaction amount for that agent (in comparison to other agents), the number of transactions involving money sent to certain countries (in comparison to other agents), the number of fraud complaints received (in comparison to other agents), and so forth. These scores and others may be combined to yield a composite score, which would be calculated for each new transaction as it is received. There are many other kinds of data that could be used as a basis for calculating scores, some of which will be described later.

As should be appreciated, aggregating data (data from previous transactions and the current transaction) permits a much more comprehensive risk assessment of a transaction in light of previous transactions. With prior transactions stored at or accessible by the money transfer system, the data needed can be quickly accessed for a real time risk assessment.

In another embodiment, rules for the various rules engine can be developed and refined over time based on transaction data (prior transactions and, in some embodiments, current transactions) as part of a risk model. This can be done using Z scores as well, such that when a combination of Z scores yields a perceived higher (or lower) risk than previously recorded, a rule reflecting that risk can be established or refined to reflect that changed risk. Certain characteristics of transactions can be scored (based on both past transactions and new transactions as they are received at the money transfer system), and when a score reaches, for example, a level indicating a higher risk than previously thought, the rules can be updated to reflect such higher risk. As a simple example, fraud complaints filed in connection with transactions conducted by a given agent or country can be considered. When a certain transaction amount (say $5,000) gives rise to a significantly higher Z score (for number of fraud complaints for a given agent or country), a rule can be developed or refined to elevate the risk level given to transactions at that amount (e.g., when conducted by the given agent or within the given country). In some embodiments, the refinement of the rule can be done after an investigation and analysis of the underlying facts by an employee of the money transfer system operator. In another embodiment, the refining of the rule may be automatic, i.e., as soon as a measured risk reaches a predetermined level, the rules are automatically refined to reflect a higher risk for subsequent transactions having that characteristic.

As should be appreciated, there could be implemented a continuous feedback of information on risks as transactions are conducted. For example, a rules engine may be initially developed with assumptions (perhaps based on government requirements or the experience of the operator) as to certain transaction characteristics and the inherent risk associated with those characteristics. Certain mitigation activities can be undertaken to reduce the risk (employing restrictions on certain transactions, or investigating transactions where risk is believed to be inherent). After mitigation activities have been conducted, any residual risk is measured and reported, and provided to a risk modeling system and to a risk assessment engine in order to develop and refine (and thereafter apply) rules for assessing risk. Continuing use of the risk assessment system and the risk modeling system will provide data as to whether risk needs to be further mitigated (e.g., based on whether improper transactions have been reduced based on refinement of rules). Further mitigation activities can be undertaken as necessary, with the ultimate expectation that, over time, the risk (and actual instances of improper transactions) will be reduced as transactions are approved or rejected based on the continually refined rules.

As noted earlier, one feature of various described embodiments is the "real time" assessment of transaction risks, based on not only characteristic data of the current transaction, but also data from past transactions which are relevant to the current transaction. The terms "real time" or "near real time" are used herein to refer to a process or action that occurs within a relatively short time. The terms real time and near real time are not intended to necessarily imply an instantaneous result or action. Rather, the terms are used to refer to process or actions that can be performed relatively quickly, such as within several milliseconds in some instances, and in other instances, within several seconds or minutes. In such a way, the transaction can be assessed before it might be accepted or completed at a transaction terminal.

To better understand the invention through the description of a specific implementation, reference is made to FIG. 1, which is a block diagram illustrating a simplified embodiment of a money transfer system or network 100. The money transfer system may be operated by a money transfer entity or service provider, such as WESTERN UNION, and may be capable of performing a variety of consumer-based money transfer transactions from payors (senders) to payees (recipients). For example, money transfer network 100 may be capable of performing wire transfers and bill payment transactions. A wire transfer may be made from one party to another party, and may involve cash being transferred. Money transfer network 100 may include one or more agent locations 120, one or more websites 140, telephone operator and/or interactive voice response (IVR) systems 150, mobile devices 160, and a money transfer server or host system (MTS) 110.

Agent or money transfer locations 120 may represent various kiosks and/or other physical locations where payors and payees may conduct money transfer transactions. For example, WESTERN UNION has hundreds of thousands of agent or money market transfer locations worldwide. At agent locations 120, a person, such as a clerk, may serve as a representative of the entity providing the money transfer service. Payors and payees may conduct money transfer transactions by interacting directly with an agent of the money transfer entity at the agent location. Transactions conducted at an agent location may be conducted using a variety of different payment methods. For example, cash, checks, credit cards, debit cards, and stored value cards are all possible methods through which a payment may be received from a payor or provided to a payee. Also, at an agent location, payors and payees may interact directly with a kiosk or terminal that is part of the money transfer network 100. Alternatively, the agent of the money transfer service provider or operator may interact with the kiosk or terminal on behalf of the payor or payee.

Websites 140 allow payors and payees to conduct money transfer transactions via the Internet. A payor may provide payment and transaction information to money transfer system 110 via website 140. For example, a payor may provide bank account information or credit card account information to money transfer system 100 via website 140. The system 110 may access such accounts, maintained at one or more financial institutions 170 (e.g., banks, credit unions, savings and loan associations, and other institutions maintaining accounts), through one or more networks 130. Likewise, payees may receive payment from money transfer system 110 via website 140. For example, a payee may provide a bank account number for funds to be deposited at one of the financial institutions 170, via website 140 and network 130. Website 140 may also permit a payor or payee to determine the status of a money transfer transaction. If a payor is conducting the money transfer using a bank account, credit card, stored value card, or using some other payment method besides cash, he or she may be able to conduct the entire payor-side transaction, and subsequently determine its status at any time (pending, completed, funds picked-up, etc.), using the website 140. Likewise, if the payee is receiving the funds via a method other than cash, he may be able to complete his payee-side transaction (and determine its status) using website 140. Alternatively, if either the payor or payee is conducting the transaction in cash, some of the information necessary to conduct the money transfer transaction may be supplied via website 140, with the cash being exchanged at an agent location 120.

Telephone operator and/or IVR system 150 may allow a payor and/or payee to conduct the money transfer transaction via a telephone call to the telephone operator and/or IVR system 150. Payors and payees may provide the information necessary to conduct the money transfer transaction via the telephone, either to a human operator, or to an interactive voice response system. If a payor is conducting the money transfer using a bank account, credit card, stored value card, or using some other payment method besides cash, he may be able to conduct the entire transaction using the telephone operator and/or IVR system 150. Likewise, if the payee is receiving the funds via a method other than cash, he may be able to conduct the entire transaction using the telephone operator and/or IVR system 150. Alternatively, if either the payor and payee is conducting the transaction in cash, some of the information necessary to conduct the money transfer transaction may be supplied via the telephone operator and/or IVR system 150, with the cash being exchanged at an agent location 120.

Also, it may be possible to interact with money transfer network 100 via any one of various mobile devices 160. Mobile devices 160 may represent various wireless devices that can communicate with money transfer system 110. For example, mobile device 160 may include cellular telephones, smart phones, handheld personal communication devices, laptops, tablet computers, etc. Mobile devices 160 may load a website to interact with money transfer system 110. Alternatively, mobile devices 160 may run one or more pieces of software, such as applications or firmware configured to allow interaction with money transfer system 100. Via mobile devices 160, it may be possible for a payor to transmit funds to a payee. Also, it may be possible for a payee to receive funds via mobile devices 160. If a payor is conducting the money transfer using a bank account, credit card, stored value card, or using some other payment method besides cash, he may be able to complete the transaction using one of the mobile devices 160. Likewise, if the payee is receiving the funds via a method other than cash, he may be able to conduct the entire transaction using one of the mobile devices 160. Alternatively, if either the payor and payee is conducting the transaction in cash, some of the information necessary to conduct the money transfer transaction may be supplied via one of the mobile devices 160, with the cash being exchanged at one of the agent locations 120.

Agent locations 120, websites 140, telephone operator and/or IVR system 150, mobile devices 160 and financial institutions 170 may communicate with money transfer host system 110 via the network 130. Network 130 is illustrated as a single network in FIG. 1. This is for ease of illustration only, since network 130 may include several networks. Further, the network used for agent locations 120 to communicate with money transfer host system 110 may be different from the network used by mobile devices 160 to communicate with money transfer host system 110. The network 130 may include one or more public networks, such as the Internet, and one or more private networks, such as a corporate intranet, a network operated by a banking system (for communications to and from financial institutions 170), and a network operated by a third party that links a number of agents that may each be affiliated with the third party (e.g., a company or organization, such as a retailer, that provides agents in locations where the system operator might otherwise not have agents).

How a payor provides funds to the money transfer system 110, that is, whether via agent locations 120, website 140, telephone operator and/or IVR system 150, or mobile devices 160, does not necessarily affect how a payee may receive the funds. For example, while a payor may provide funds via website 140, a payee may retrieve the funds via one of agent locations 120. It may also be possible for a payor and payee to use the same entity, such as an agent location 120, to conduct a money transfer transaction.

Money transfer host system 110 may include one or more various subsystems used to complete a money transfer transaction. For example, the system 110 may include a host computer 112 that is configured to execute various software programs for managing money transfer transactions and for managing the communications with each of the agent locations 120, websites 140, telephone/IVR systems 150, mobile devices 160 and financial institutions 170 as described above. The money transfer host system 110 also includes a transaction database 114, a customer database 116 and one or more other database(s) 118.

Transaction database 114 may store and manage information on pending and completed money transfer transactions. Transaction database 114 may include (but is not limited to) data identifying amounts of funds provided by payors, amounts of funds due to payees, payors' names, addresses and phone numbers, payees' names, addresses and phone numbers, transaction identifiers such as money transfer control numbers (MTCNs), the locations where the transactions were initiated (e.g., the website, an address of the agent location), the location of where the transaction is expected to be completed (e.g., where the payee is expected to receive the funds), the payor's payment method (e.g., cash, credit card, money order, stored value card, check, etc.), and whether or not various money transfer transactions have been completed or are pending.

Customer database 116 may store and manage biographical and identity information associated with the money transfer service provider's customers (e.g., existing customers, both payors and payees). The stored data may include names, addresses, dates of birth, social security numbers, bank account numbers (including financial institution ID/routing numbers), and so forth. Among other things, database 116 may be accessed to collect information that is needed in order to initiate a transaction (e.g., accessed by a customer ID in order to eliminate the need for the data to be separately entered each time an existing customer conducts a transaction).

The other database(s) 118 store and manage information useful to the money transfer host in managing transactions and managing various administrative and operational tasks. As examples only, the other databases 118 may store information identifying or relating to each of the agents at agent locations 120, to each of the websites 140, to each of the telephone/IVR systems 150 and to each of the mobile devices 160 that have been enabled to conduct transactions within network 100.

While databases 114, 116 and 118 are illustrated as separate databases for purposes of generally describing the data stored therein, it should be appreciated that such data could all be housed in a single database, or stored across a much larger number of databases, linked together at either a single location or across number of remote locations. Likewise, while the host computer 112 is illustrated as a single computer system or server, its functions could be performed by a plurality of computers or servers, linked together at either a single location or across a number of remote locations.

Also seen in FIG. 1 is a real time risk assessment system 180 that evaluates the risk of each transaction being processed at the money transfer host system 110. The assessment or evaluation by the system 180 is performed with the use of rules engines 184 that define and apply various rules used in the evaluation. The evaluation of each transaction is done on a real time basis, that is, it is done at the time the transaction is conducted (in one embodiment, within a few milliseconds after transaction data is entered and then received at the system 180), with the transaction being either approved, rejected, or in some cases, rejected or held in abeyance pending the receipt of further information from the agent/consumer or from an investigation by the operator of the money transfer system. In some embodiments, the transaction is evaluated in the context of prior transactions stored in transaction database 114 (e.g., transactions involving the same payor/payee, same agent, same geographical location, etc.). The result of the risk evaluation or assessment may be provided to the terminal where the transaction data has been entered by or for a payor/payee (e.g., agent locations 120, websites 140, telephone operator and/or IVR systems 150, or mobile devices 160), as will all be described in greater detail later. While the risk assessment system 180 is illustrated as being part of the money transfer host system 110, it should be appreciated that, alternatively, it could be a separate system connected (directly or through networks 130) to the money transfer host system 110. Various features of the risk assessment system 180 will be described in greater detail later.

Also seen in FIG. 1 is a risk modeling system 190 associated with the money transfer host system 110, used for establishing rules to be used by rules engines 184, and according to one aspect of the invention, to refine and develop those rules over time based on transactions being conducted and the evaluation and investigation of those transactions. The risk modeling system 190 will also be described in greater detail later.

Thus, in brief summary, transactions that are conducted at transaction terminals (e.g., at agent locations 120, websites 140, telephone operator and/or IVR systems 150, or mobile devices 160) are processed by money transfer host system 110, using data entered at the transaction terminal and data stored at databases 114, 116, and 118. Before any transaction is completed, it is evaluated on a real-time basis for risk at risk assessment system 180 using rules engines 184, and it is indicated as approved, rejected, or subject to further action (e.g., entry of further data at the transaction terminal or investigation by the money transfer system operator), with such indication communicated at the time of the transaction to the transaction terminal. Transaction data is used by risk modeling system 190 to develop and refine (over time) the rules in rules engines 184.

Figure 2:
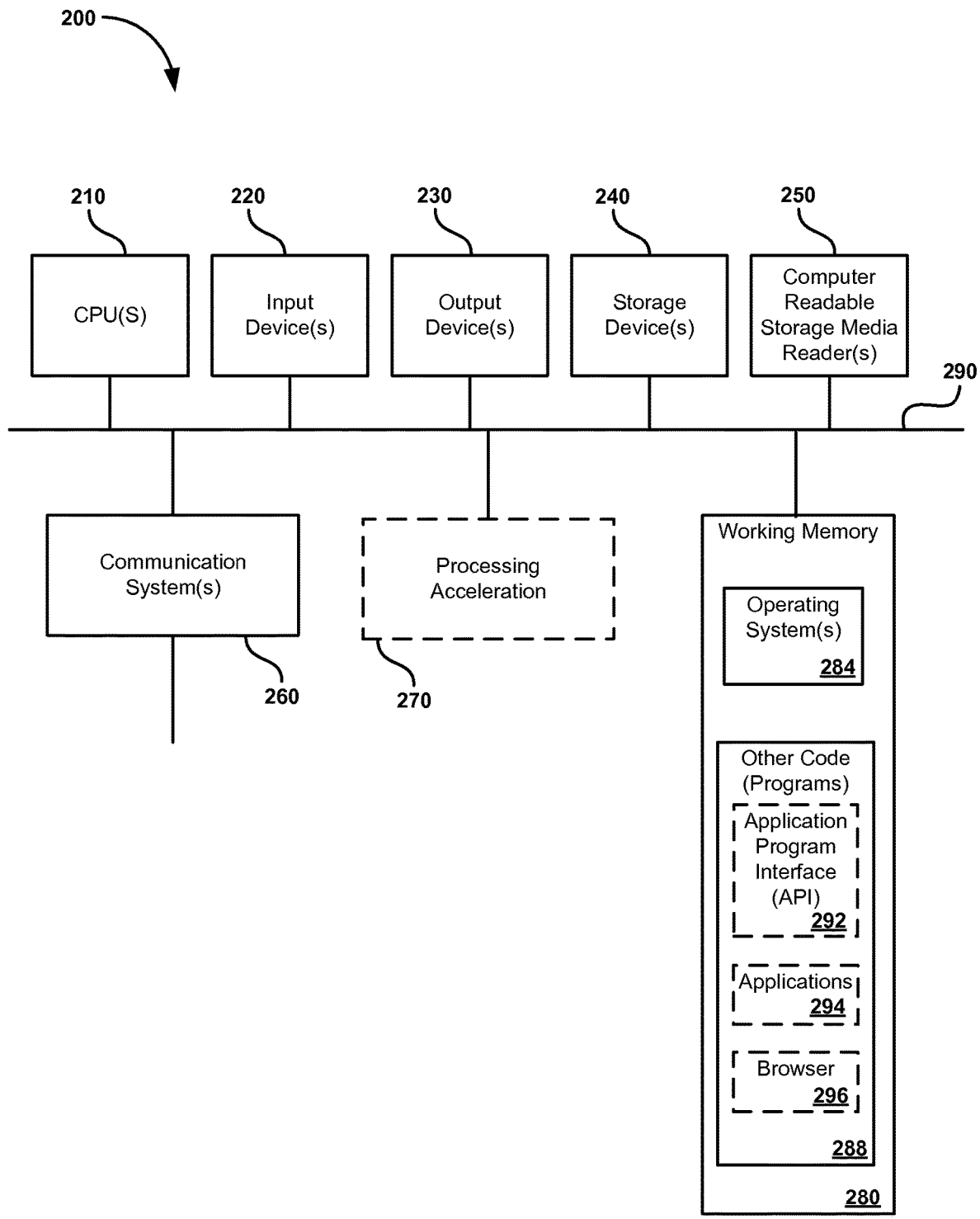
FIG. 2 is a block diagram of a computer system upon which various devices/systems illustrated in FIG. 1 may be implemented.

FIG. 2 is a block diagram illustrating an exemplary computer system upon which embodiments of the present invention may be implemented. This example illustrates a computer system 200 which may be used, in whole, in part, or with various modifications, to provide the functions of the money transfer host system 110, the agent location 120 systems, the systems managing the websites 140, the telephone/IVR systems 150, the mobile devices 160, the risk assessment system 180, the risk modeling system 190, and/or other components of the invention such as those discussed above.

The computer system 200 is shown comprising hardware elements that may be electrically coupled via a bus 290. The hardware elements may include one or more central processing units 210, one or more input devices 220 (e.g., a mouse, a keyboard, etc.), and one or more output devices 230 (e.g., a display device, a printer, etc.). The computer system 200 may also include one or more storage devices 240, representing remote, local, fixed, and/or removable storage devices and storage media for temporarily and/or more permanently containing computer-readable information, and one or more storage media reader(s) 250 for accessing the storage device(s) 240. By way of example, storage device(s) 240 may be disk drives, optical storage devices, solid-state storage device such as a random access memory ("RAM") and/or a read-only memory ("ROM"), which can be programmable, flash-updateable or the like.

The computer system 200 may additionally include a communications system 260 (e.g., a modem, a network card—wireless or wired, an infra-red communication device, a Bluetooth® device, a near field communications (NFC) device, a cellular communication device, etc.). The communications system 260 may permit data to be exchanged with a network, system, computer, mobile device and/or other component as described earlier. The system 200 also includes working memory 280, which may include RAM and ROM devices as described above. In some embodiments, the computer system 200 may also include a processing acceleration unit 270, which can include a digital signal processor, a special-purpose processor and/or the like.

The computer system 200 may also comprise software elements, shown as being located within a working memory 280, including an operating system 284 and/or other code 288. Software code 288 may be used for implementing functions of various elements of the architecture as described herein. For example, software, stored on and/or executed by a computer system, such as system 200, can thus configure the system 200 to provide the functions of the money transfer host system 110, the agent location 120 systems, the systems managing the websites 140, the telephone/IVR systems 150, and the mobile devices 160, the risk assessment system 100 and the risk modeling system 190.

Also seen in FIG. 2 are specific examples of common software components (application program interface (API) 292, applications 294, and a browser 296) that may resident in the code 288 in several of the systems seen in FIG. 1.

It should be appreciated that alternate embodiments of a computer system 200 may have numerous variations from that described above. For example, customized hardware might also be used and/or particular elements might be implemented in hardware, software (including portable software, such as applets), or both. Furthermore, there may connection to other computing devices such as network input/output and data acquisition devices (not shown).

Figure 3:
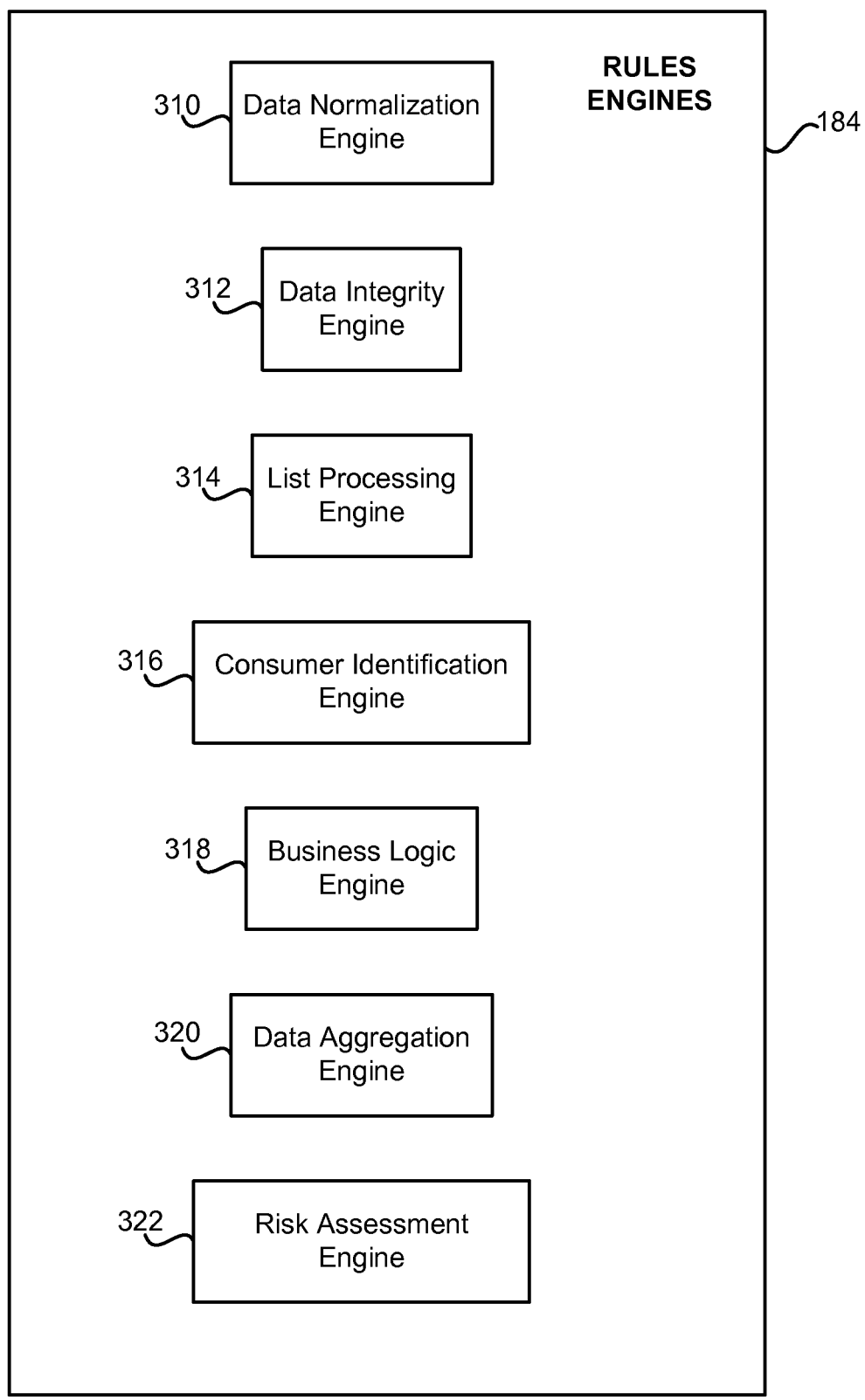
FIG. 3 is a simplified block diagram of rules engines used in the system of FIG. 1.

FIG. 3 illustrates in greater detail the rules engines 184 used by the risk assessment system 180. As illustrated, the rules engines include a data normalization engine 310, a data integrity engine 312, a list processing engine 314, a consumer identification engine 316, a business logic engine 318, a data aggregation engine 320, and a risk assessment engine 322.

Before proceeding with a detailed description of the various rules engines, it should be noted that a rules engine is software or programming code that is callable by a management system (such as host computer system 112, risk assessment system 180, or risk modeling system 190), and provides rules or logic flows that permit polices and operational decisions involving money transfers to be dynamically defined, executed, tested, refined, and maintained separately from the application code that processes money transfer transactions (and that might be more static). However, it should be appreciated that in some embodiments a rules management system working in conjunction with the rules engines may be separate from systems 112, 180, and

190, such as by having some processing functionality built into or adjunct to each the various rules engines or as part of a computer system separate from the systems 112, 180 and 190. Further, it should be appreciated that, in some embodiments, some or all of functional features of the various rules engines could alternatively be implemented in software code that might not be necessarily part of a rules engine.

The data normalization engine 310 "normalizes" transaction data entered at one of the transaction terminals and received at the money transfer host system 110. Such normalization may be required because, as mentioned earlier, there can be millions of money transfer transactions processed each day by a single money transfer organization. Those transactions may come from many different systems, agents, agent networks, and countries around the world. The order and format of data may vary from system to system, and the order and format is normalized so that it is arranged the same way for each transaction for processing by the risk assessment system 180. As an example, one agent network (for example, affiliated with a large retail grocery chain having many stores with terminals where money transfers may be made) might provide a telephone number as part of a money transfer transaction in three fields (3 digit area code, 3 digit prefix and 4 digit number), whereas the risk assessment system 180 processes phone numbers as a single ten digit field. The engine 310 converts all phone numbers to a single ten digit field. As another example, transaction and other monetary amounts may be processed in dollar equivalents at system 180, and so depending on which network is sending the data, monetary amounts may need to be converted to dollars. As noted earlier, the risk assessment system 180 uses both past transactions and current transactions as part of its risk assessment of any transaction, and so data that has been normalized may be stored (e.g., in transaction database 114) for later use as subsequent transactions are received and assessed.

The data integrity engine 312 checks the integrity (e.g., accuracy, completeness and validity) of the transaction data received at the system 180. As an example, one rule in the engine 312 may be that certain fields must have entered data (e.g., an agent completing a transaction must enter a phone number or an address for a payor/payee for any transaction, or alternatively, for any transaction over a relatively small amount, say $100. Another rule might require that an address field have both numbers and alpha characters in an address field (thus, an entry of only "689" for an address would fail to meet the rule). As another example, more complex rules might establish data in certain fields as suspicious and require that they be rejected (e.g., a telephone number with all (or an excessive number of) zeros, or a driver's license number that has numbers/characters or digits that are known not to be used by the governmental entity issuing the driver's license). It should be appreciated that over time, data integrity rules (as well as the rules in the other rules engines) can be refined by the risk modeling system 190 as transactions are processed and found to be fraudulent or involve high risk (i.e., certain patterns of data given by a payor might be found over time as likely to be misleading or false, and rules requiring rejection of such data can be built into the engine 312).

In some instances, the rules applied by data integrity engine 312 may depend on data that has been normalized at data normalization engine 310. For example, engine 310 may have rules for inserting a country of the sender based on information on the agent processing the transaction. The government of that country may require certain types of data (e.g., a government issued ID number) be included in an money transfer, and the data integrity engine 312 will flag a transaction from that country that does not have that data. Based on the application of rules at engine 312, a transaction could be approved, rejected outright (contains such serious integrity issues that it will not be processed), or rejected subject to additional or corrected information being provided, or held for further processing or investigation (e.g., it may be accepted at the send side but not completed at the recipient side until the nature of the transaction had been determined to be proper).

The list processing engine 314 generally reviews each transaction against two types of lists: (1) government sanctions lists, such as the UN sanctions list and various lists maintained by the U.S. Office of Foreign Assets Control (SDN list, Counter Terrorism Sanctions list, Counter Narcotics Trafficking Sanctions list, and others), and (2) lists developed by the operator (perhaps based on its own experiences, where certain payors/payees are blacklisted because of past improper or illegal money transfers). However, the rules in engine 314 do more than merely compare sender/recipient names against those on the lists. The engine collects, where possible, other information pertaining to the person or entity on the lists (such as addresses, phone numbers, dates of birth, and so forth). If there is a name match, any other information on the subject is retrieved (e.g., from database 114 or 116) and compared to information given by the payor/payee. Depending on the degree of similarity, a match might be found. In some situations, when there is potential match (one or more fields match, but the personal information may be common enough that there might be multiple people with the same identifying information—same name, same city of residence, etc.), the payor/payee may be asked for a date of birth (and also asked to provide proof of date of birth). The engine may go through several logic loops asking for additional information (based on the potential for match from basic information given). For example, if there is a close match on a listed name, and the payor/payee is asked to provide proof of date of birth (that matches the date of birth associated with a name on the list), the payor/payee will be told (in real time at the time of the transaction based on a response from the engine 314) that the transaction is being held and will be investigated further (e.g., by an investigator associated with the system operator). If the investigation determines that there is an actual match, the transaction may be rejected, and the funds seized and reported to the appropriate authority. If the investigation determines that there is not an actual match to a person/entity on the list, the funds are released to the payee.

The consumer identification engine 316 reviews components of the current transaction data to determine if a consumer (payor/payee) has had prior transactions. In one embodiment, the risk assessment system accesses all transactions for the previous 5 years (stored, e.g., within database 114), and applies rules to compare data fields (between the current transaction and all past transactions) in order to locate the same or a similar name (and other corresponding data, such as address, phone number, data of birth, photo ID number, etc.) to confirm whether or not the consumer in a current transaction is the same as a consumer in a prior transaction. The engine 316 may check for slight variations in names (middle initials present or omitted), for likely misspellings, for knick names, and for marriage information that might explain the same person presenting different names in two different transactions (e.g., maiden name and subsequent married name). As one example, the engine 316 might identify a person using a given name in one transaction and a recognized knick name in another transaction as, in fact, the same person, especially if other information matches (address, phone number, etc.). The engine 316 will identify all of the transactions that have the same consumer, and may apply some simple rules-based calculations to identify whether the current transaction (when considered in the context of earlier transactions) might be improper. For example, the engine 316 may determine that a consumer has had a relatively large number of transactions (past and current) over a very short period of time (e.g., over several days), indicating possible money laundering. As another example, the engine 316 may identify a consumer that has made periodic money transfers of nearly identical amounts to the same people (indicating periodic payday transfers to relatives that are likely low risk). In other circumstances, the identified transactions may be provided to other rules engines for analysis under their rules.

The business logic engine 318 evaluates single transactions and applies rules that have been developed by the operator of the system 100 to take into account circumstances that would indicate possible fraud or other improper activity. This engine could have a large number of rules developed over time and based on experiences of the operator. As examples, the operator might become aware of increased organized crime activity in a given city or cluster of zip codes. An exemplary rule would require any sender, having an address in that city (or zip code cluster) or using an agent in that city, provide proof of identification for any transaction over $100. As another example, the operator might become aware of connections between criminal activity in two locations (say drug trafficking where contraband originates in Chihuahua, Mexico and has a destination in Tennessee). Any payments from a sender in the state of Tennessee to a recipient in the state of Chihuahua, Mexico over a certain dollar amount (that might represent payment for contraband) might invoke a rule requiring the sender provide two IDs, including a photo ID.

The data aggregation engine 320 aggregates transactions, such as for a single consumer (e.g., identified by consumer identification engine 316). It also may apply relatively straight forward calculations to those transactions in applying its rules. For example, for a single consumer, the aggregation engine could determine (for a specified period of time) the number of transactions have been conducted by the consumer, the number of different agents that have been used, the total amount of all transactions for the consumer, the frequency of the transactions, the number of different recipients that have received money, the number of different countries that money has been sent to, and so forth. The rules in the aggregation engine 320 could also establish thresholds for the calculations just mentioned. That is, one rule might indicate that when the total amount for transactions by the consumer over one month exceeds $5000, more scrutiny (e.g., photo IDs) might be required. Another rule might require increased scrutiny when the frequency of transactions (say, over one month) exceeds more than two per week. Yet another rule might require that when more than five different agents have been used over one month (indicating a likelihood of agent hopping to avoid scrutiny), no further transactions can be conducted. As mentioned, the rules could be numerous and based on the transactions that have been aggregated for a particular consumer. In some embodiments, other categories of transactions could be aggregated. As an example, when a transaction involving a specific agent is conducted, the aggregation engine could aggregate all transactions conducted by that agent (say, over 6 months). When the average transaction amount exceeds a specified amount, the agent may be required to provide additional information to the operator, such as total transactions per employee at the agent location (so as to identify agent employees involved in large transactions). These are, of course, only a few of many possible examples. Other characteristics or categories of transaction data that could be aggregated could include payee, address, phone number, geographical location (where the transaction is conducted by the agent), date of birth, social security number, bank account number (used provide or to receive funds for the money transfer), and so forth.

The risk assessment engine 322 performs more sophisticated and complex risk assessment than that performed at the other rules engines. The engine 322 also looks at levels or layers of risk beyond those assessed at the aggregation engine 320. More specifically, engine 322 collects data and assesses risk associated with categories of data from the transaction at hand, but may use data from more than one category of transaction data to evaluate the risk, e.g., the payor/payee, and agent, address, phone number, geographical location, date of birth, social security number, and bank account number (all for either the payor or payee).

As an example, if all of a given consumer's transactions have been aggregated (by aggregation engine 320), and the number of different agents being used results in a determination of risk at the aggregation engine 320 (i.e., possible agent hopping), the risk assessment engine 322 may be used to collect and aggregate information on each of the agents identified in that consumer's transactions (rather than just information on the consumer himself/herself). Thus transactions for the identified agents are collected and the risk associated with each agent is identified, and such risk is factored into the risk associated with the transaction of the original consumer. Stated differently, if the consumer is using a higher than normal number of agents (and such circumstance results in assessment of a higher risk at the aggregation engine 320), risk assessment engine 322 might further analyze and evaluate each of those agents based on the transactions conducted by those agents apart from the original consumer. If risk assessment engine 322 determines that there is higher than normal risk with one of more of the agents involved, the transaction at hand (for the original consumer) will be assessed a higher risk at the risk assessment engine 322 in addition to any risk determined at the aggregation engine 320 (or other rules engines).

A more detailed explanation of an embodiment using the various rules engines seen in FIG. 3, including the risk assessment engine 322, will be provided below in conjunction with FIGS. 5 and 6.

Figure 4:
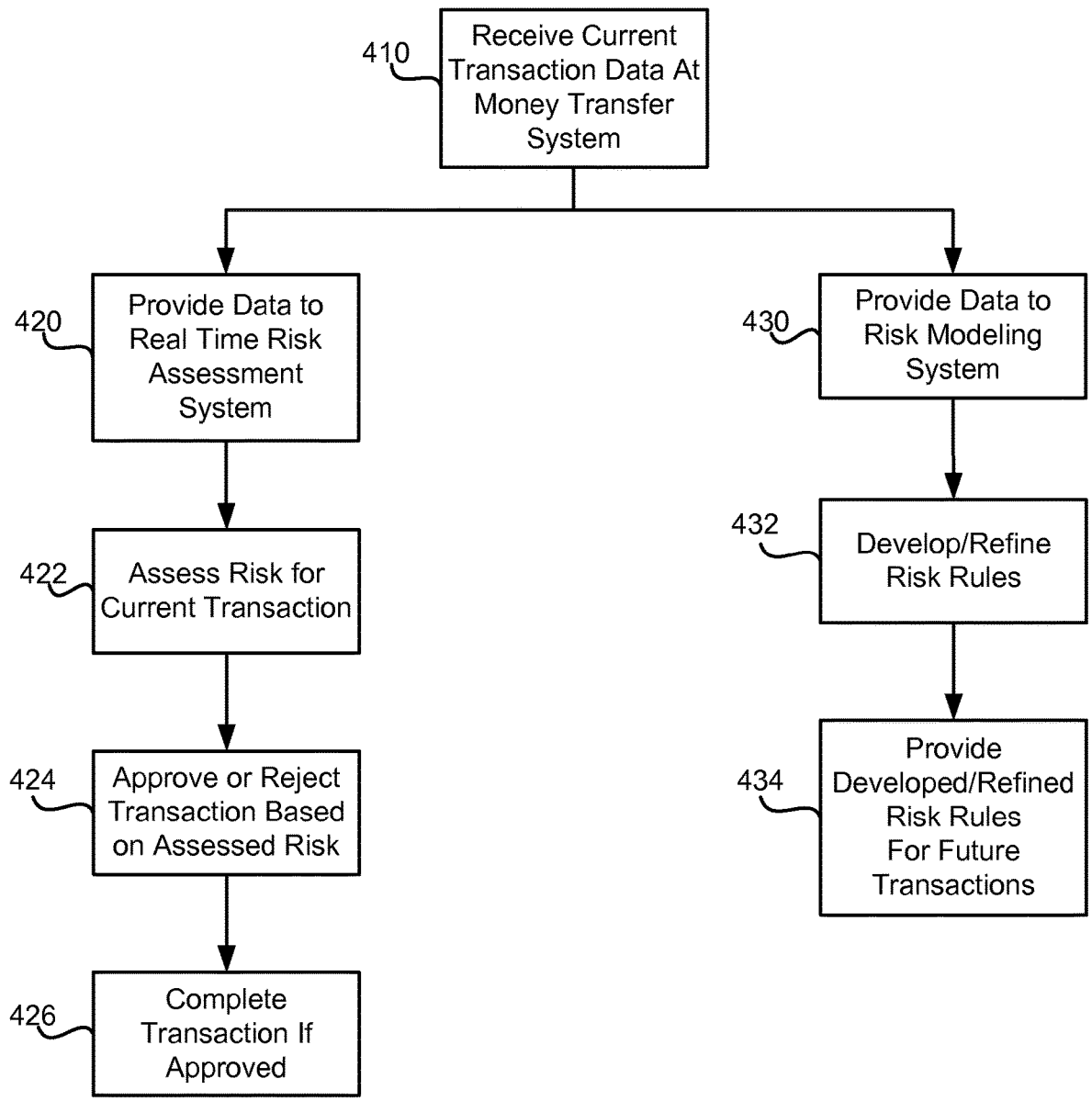
FIG. 4 is a general flow diagram of a process for processing money transfer transaction data at the risk assessment system and the risk modeling system seen in FIG. 1.

FIG. 4 illustrates the basic operation of one embodiment of risk assessment system 180 and risk modeling system 190, in conjunction the money transfer system 110. Initially, transaction data (for a new or current transaction) is received at the money transfer system 110 (step 410) in response to entry of that data at a transaction terminal (e.g., at agent locations 120, websites 140, telephone operator and/or IVR systems 150, or mobile devices 160). The transaction data is separately provided to both the risk assessment system 180 (step 420) and to the risk modeling system 190 (step 430).

At the risk assessment system, the risk for the current transaction is evaluated or assessed (using rules engines 184) at step 422. The rejection is either approved or rejected at step 424 (or in some cases, not illustrated, rejected or held in abeyance subject to further information or investigation). If approved, the transaction is completed (step 426) with the amount of the transaction sent, for example, through the money transfer system to an agent location for pick up by the recipient.

At the same time, the transaction data provided to the risk modeling system is assessed (along with other transaction data, such as data on previous transactions stored in database 114) to build risk models, which in turn are used to develop and further refine various rules within the rules engines 184 (step 432). Those developed/refined rules are provided to the rules engines (step 434) for use in assessing risk in future transactions.

Figure 5:
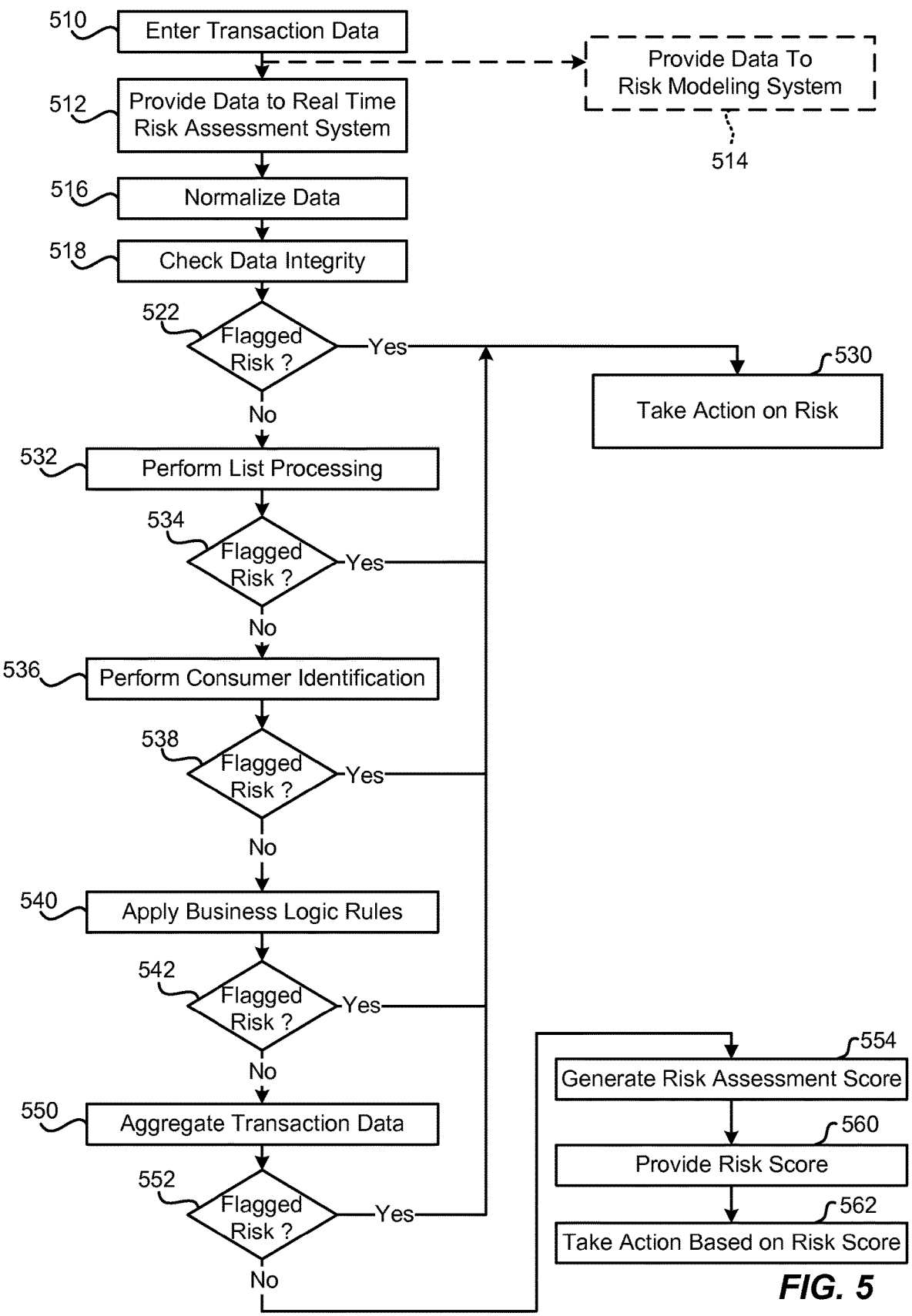
FIG. 5 is a detailed flow diagram illustrating the processing of transaction data at the risk assessment system.

Turning now to FIG. 5, there is illustrated one embodiment of a process for assessing risk of money transfer transactions conducted within the money transfer network 100 seen in FIG. 1, using the risk assessment system 180 (FIG. 1) and the rules engines 184 (FIGS. 1 and 3).

Initially, data is entered at one of the transaction terminals (step 510), and provided through the host computer 112 to the risk assessment system 180 (step 512). While not part of the transaction risk assessment itself, the same transaction information may also sent (step 514) to the risk modeling system 190 (illustrated with broken lines in FIG. 5) in order to develop/refine rules in the rules engines, as mentioned earlier and as will be described in greater detail later in conjunction with a further description of features of the risk modeling system 190.

The transaction data received at the risk assessment system 180 is processed with the use of the rules engines 184 described earlier in conjunction with FIG. 3. The transaction data is first normalized at step 516 (applying rules in the data normalization engine 310). The integrity of the data is then checked at step 518 (applying rules in the data integrity engine 312). If a significant or actionable risk is identified or flagged (step 522) at the data integrity engine 312, then an action is determined to be needed (step 530) and an appropriate message returned from the host computer 112 to the transaction terminal where the money transfer is being requested. The action to be taken as a result of the integrity check will typically be a request for additional/corrected data, however, other actions may also be indicated.

It should be noted that, since step 530 will only arise if an actionable risk is identified at one of the various rules engines, step 530 will typically not include approval of the transaction (rather, approval would normally be indicated after application of rules at all of the other rules engines). Thus, the actions at step 530 would likely be rejection of the transaction, rejection subject to receiving further information, or holding the transaction in abeyance subject to investigation by the operator or others.

A step 532, the transaction data is evaluated in the list processing engine 314. If there is a match or potential match to a person/entity on one of the maintained lists, a risk is flagged (step 534) and further action is taken at step 530. At step 536, the transaction data is evaluated at the consumer identification engine 316. As described earlier, such engine will typically identify all transactions that the same consumer has conducted. If the rules at the engine 316 indicate a risk (step 538), further action is taken at step 530.

At step 540, the transaction data is evaluated by applying business logic rules from the business logic engine 318. If a risk is flagged (step 542), further action is taken at step 530. Otherwise, the process proceeds to aggregating transaction data (step 550). At step 550, the transaction data is aggregated and evaluated at the data aggregation engine 320. If a risk is flagged (step 552), further action is taken at step 530. Otherwise, the process proceeds to risk assessment and scoring (step 554) using the risk assessment engine 322.

More specific features and steps taken within the risk assessment engine 322 at step 554 will be described shortly in conjunction with FIG. 6. However, briefly the risk assessment engine will provide a score or scores indicative of risk using a much more comprehensive level of assessment and analysis (than the other engines 310-320), and provide a score (reflecting the more comprehensive assessment of risk) at step 560. Based on the risk score, action is taken by money transfer system at step 562. Such action might be approval (assuming that no unacceptable risks have been identified at any of the risk engines). If an unacceptable risk has been found, then actions similar to those in step 530 might be required (rejection, rejection subject to receiving further information, or holding the transaction in abeyance pending investigation by the system operator). In one embodiment the risk score may simply be a composite of Z scores determined by assessment engine 322. In an alternative embodiment, the risk score is provided as a score on a numerical scale, say from 0-100 (with 0 being no risk and 100 being the highest risk). The money transfer system might, as an example, approve any transaction having a risk score below 20, require further information (such as supplemental proof of identify from the sender or recipient) for any transaction having a score between 20 and 60, hold for further investigation any transaction having a score between 60 and 80, and reject outright any transaction having a score higher than 80. Other methods for scoring (e.g., non-numerical, such as merely classifying the risk as one of several risk levels—low, medium and high) and other methods for taking different actions based on such scores are, of course, possible.

It should be noted that while, for ease of description, the steps in FIG. 5 are shown in a particular order, many of the steps could be performed in a different order, and is some cases, they could be performed concurrently. In one exemplary embodiment, data integrity (step 520), list processing (step 523), consumer identification (step 536) and aggregating transaction data could all be performed concurrently (each of their respective rules engines applying rules concurrently to the received transaction data). In such embodiment, data normalization rules (at engine 310) might be applied before other rules, since it could be more efficient to have all data normalized before presented to the other rules engines. Also, in one embodiment, the risk assessment engine might receive risk indicators from other rules engines prior to applying its rules. For example, in one embodiment, a risk identified at data integrity engine 312, list processing engine 314, consumer identification engine 316, business logic engine 318, or data aggregation engine 320, could lead to a more comprehensive risk analysis at risk assessment engine 322 (even if the identified risk is not at a high enough level from any given rules engine to initiate action at step 530). On the other hand, if the other engines find no significant risk in such embodiment (there is no flagged risk), the risk assessment engine 322 might simply score the risk using the risk information from the other engines (without further assessing risk on its own) and provide the risk score to the money transfer host computer 112. In other embodiments, the risk assessment engine 322 will assess and score all transactions, even if no risk is found at the other engines.

Figure 6:
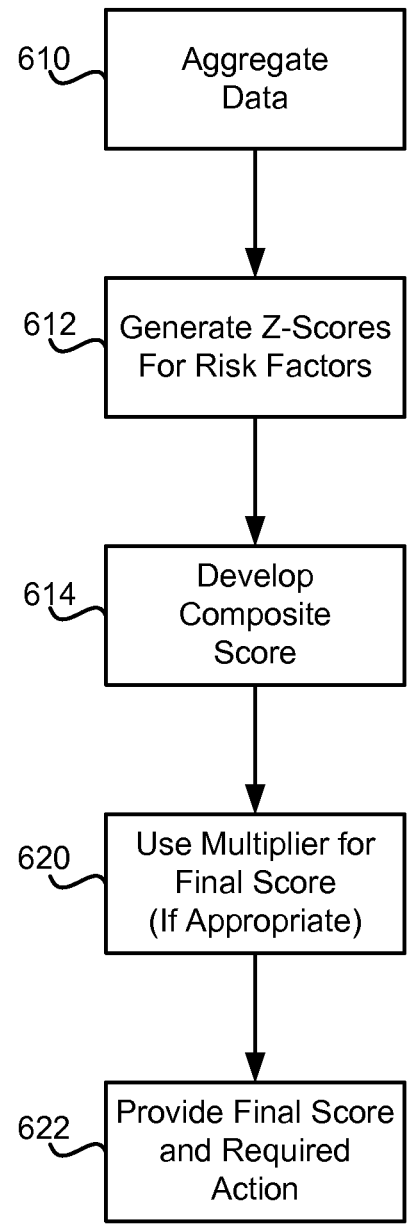
FIG. 6 is a flow diagram illustrating a process for assessing risk using the risk assessment rules engine seen in FIG. 3.

Turning now to FIG. 6, there is seen a more detailed illustration of the process for risk assessment and scoring using the rules in the risk assessment engine 322. The engine 322 first applies rules for aggregating the data, step 610. As noted earlier, aggregation at step 610 by risk assessment engine 322 may be different and more comprehensive that the aggregation done at data aggregation engine 320 (described above).

In one embodiment, the aggregation of data at step 610 may depend on the risks identified at the other rules engines (data integrity engine 312, list processing engine 314, consumer identification engine 316, business logic engine 318, and data aggregation engine 320). As noted earlier, if one of the other rules engines identifies a risk (but not at a sufficiently high level of risk to take action at step 530 (FIG. 5)), the risk assessment engine 322 may perform a more extensive aggregation and assessment of data than that done at the other rules engines.

As one example, suppose a transaction is conducted by a Sender A at an Agent B location. The risk associated with the transaction is evaluated using one of the rules engines 312-320 (data integrity engine 312, list processing engine 314, consumer identification engine 316, business logic engine 318, or data aggregation engine 320), and a risk is identified. If the risk is not significant enough to take action, the transaction data is provided to risk assessment engine 322 with an indication of some (but not a high level) risk. In this particular example, assume that there is some risk by virtue of the Sender A having conducted transactions that total a relatively large amount over one month (say, $4500), but not large enough to trigger rejection or a hold (which might occur for a slightly larger amount, say, $5000) The rules within the risk assessment engine 322 will initiate a process for evaluating the transaction further, aggregating data not only associated with Sender A, but also with other data categories or characteristics from the transaction. For example, the risk assessment engine 322 might require aggregation of all transactions involving the same Agent B over some specified period of time (say, one year or several years). The risk associated with all of the transactions associated with Agent B would then be evaluated using the that aggregated data for Agent B. Of course, transaction categories or characteristics other than the agent could also be aggregated, e.g., all transactions within the same city or zip code, all transactions to the same recipient, all transactions to the same destination (city, country, zip code), and so forth.

Once the data has been aggregated at step 610, a score (such as a Z score) is calculated for each of the aggregated data categories (and risk factors), step 612.

A Z score is particularly useful way of measuring the risk associated with aggregated data, such as in a money transfer transaction. In particular, a Z score is a statistical measure of how much a value is above or below a mean or average in a given population (more specifically, how many standard deviations the value is above or below the mean). A Z score is calculated using the following formula:

$$Z = \frac{\chi - \mu}{\sigma}$$

where $\chi$ is the value to be standardized,
where $\mu$ is the mean of the population, and
where $\sigma$ is the standard deviation of the population.

In the particular example just given, say that one risk factor or measure of an agent's risk is the number of fraudulent transaction complaints (e.g., complaints by senders) over a period of time (e.g., one year) in connection with transactions handled by that agent. In the case of the agent at issue, say there have been 100 reported fraud complaints for the value to be standardized ($\chi$), the mean ($\mu$) for reported fraud complaints for all agents (the population) is 50, and the standard deviation ($\sigma$) for all agents is 25 (the standard deviation is well known statistical computation based on a given population and is usually computed as the square root of the variation of the population from the mean or average). In this example, a standard deviation of 25 means that most agents will have total fraud complaints within 25 of the mean or average of 50.

Thus, for this example, the Z score for fraud complaints for the given agent using the formula is:

$$Z = \frac{100 - 50}{25} = 2$$

In our example, 2 would be considered a statistically significant Z score for this risk factor (as well as most risk factors).

As another, simple example, an additional risk factor might be the value of the specific transaction being handled by the Agent B for Sender A. Say for the particular transaction, the amount of money being sent in the transaction (the value of the risk factor to be standardized) is $2000 ($\chi$), the mean value ($\mu$) for all prior send transactions for all agents in the same country (the population) is $1000, and the standard deviation ($\sigma$) for all prior send transactions for agents in that country is $500. Using the formula, the Z score is 2, again a statistically significant Z score.

Other risk factors for given data categories could also have Z scores calculated (a list of exemplary factors that could be used in assessing risk for an agent and Z scores for those exemplary risk factors will be provided later in conjunction with a description of risk modeling features).

It should be noted that while the exemplary embodiment uses Z scores in assessing risk, in some alternative embodiments other means of scoring risk could be used (e.g., based on numerical values associated with risk factors), either alone or in combination with Z scores. As an example, a score for fraud complaints concerning an agent could simply be a number from 1 to 10, based on the actual number of fraud complaints received for an agent ("1" assigned to those agents in the group having the fewest complaints, and "10" being assigned to those agents in the group have the most complaints).

Once a Z score is calculated for each of the risk factors, the risk scores are combined (step 614) into a composite score for the agent (or other transaction data category). Also, the individual risk factors could be weighted (e.g., with weights based on the judgment of the operator), prior to being combined. In some cases, a multiplier might be used to increase or decrease the risk score, step 620. As an example, the risk associated with an agent might be determined by the agent's location (such as zip code) and the perceived likelihood of crime and other improper activity in that location. An agent in a high risk geographical location might have its composite score increase by, say, a multiplier of 1.5, resulting in a 50% increase in the composite score based on location.

At step 622, the final score is used by the risk assessment system 180 to provide a assessment for the transaction, and to provide a required action (step 562, FIG. 5). It should be appreciated that in some cases the risk score might be provided to the agent for the agent to use in deciding what action to take (e.g., when the agent is trusted to make a judgment and perhaps bears some risk if the transaction is fraudulent or improper). In other cases, the required action is simply provided by the money transfer system to the agent in order to inform the consumer (e.g., sender) as to the disposition of the transaction (approved, rejected, held, etc.).

Figure 7:
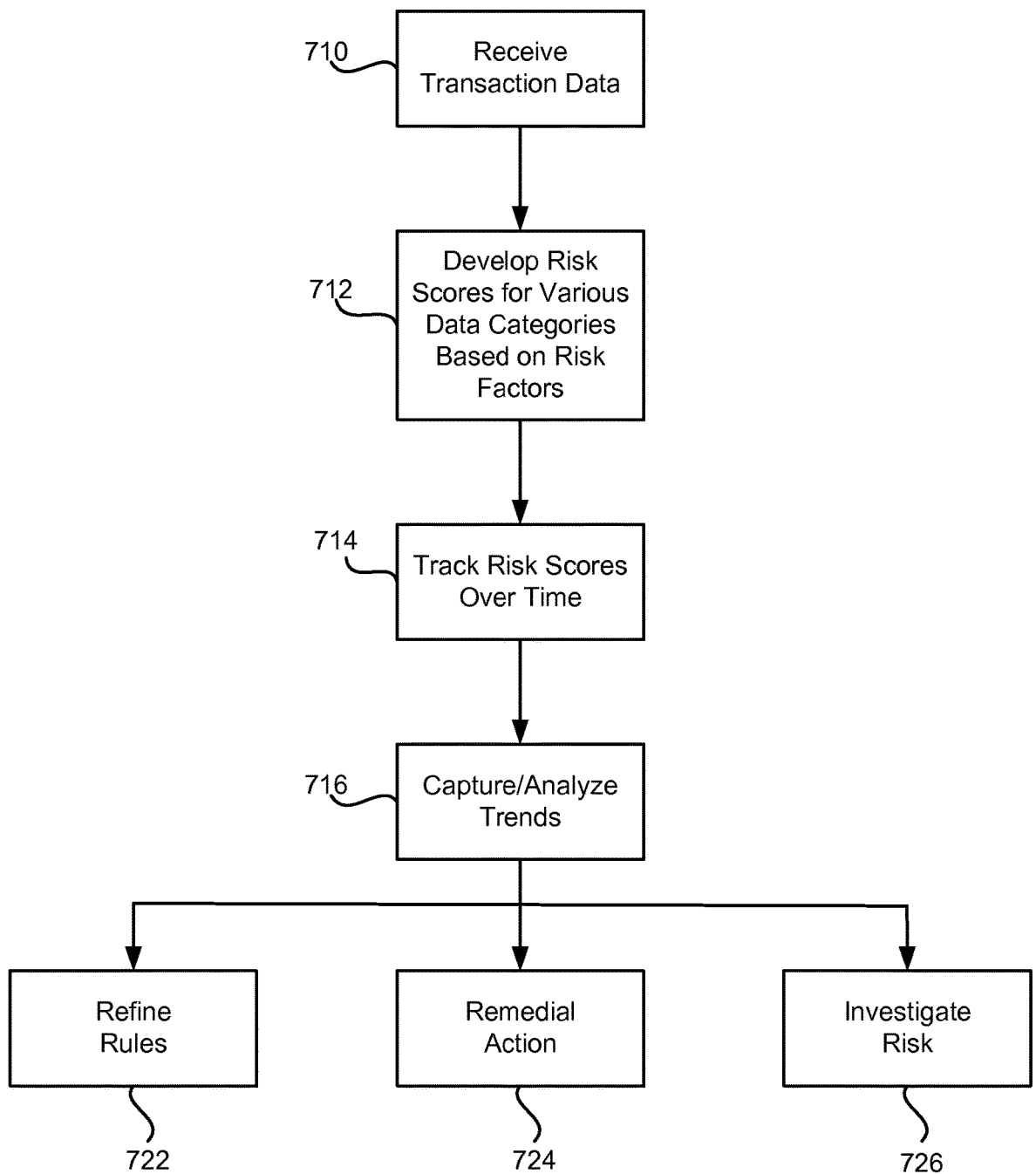
FIG. 7 is a flow diagram illustrating a process implemented at the risk modeling system seen in FIG. 1.

Turning now to FIG. 7, there is shown a general, overall process implemented in conjunction with the risk modeling system 190. Before describing the process, it should be noted that in one embodiment, the process uses data in the database 114, namely data on past transactions that have been conducted using the money transfer system 110. The transaction data will typically be historical data (the system 190 will develop and refine rules for future transactions based on past transactions, rather than assess risk of current or pending transactions), although it should be appreciated that such data may include very recent transactions that have been completed. Further, in alternative embodiments, even current transactions (still pending) might be included if sufficient and reliable data is available for those transactions for use in developing risk models.

Initially, at step 710, historical transaction data (from database 114) is received at the risk modeling system 190. In some embodiments, the historical data may be taken over a specified period of time, say several years. The data is processed by choosing a data category and using the transaction data to develop a score for that data category, based on various predetermined risk factors (step 712). A detailed example will be given shortly where the chosen data category is agent, and the risk factors are aspects of transactions that have a bearing on the risks associated with each agent. In that example, the result will be composite risk score based on the risk scores that have been calculated for each of the individual factors. The composite risk score will reflect the risk of fraudulent or other improper money transactions being conducted by the agent.

However, other data categories (within transactions) may be chosen for processing the data. Those other categories might include agent network, zip code, city, country as well as others. In those instances, for example, a composite score might be developed for each agent network, each zip code, each city, each country and so forth. In some embodiments, hybrid or combination categories might be used, for example, each agent within a specified zip code. The operator of the risk modeling system can choose categories based on the type of activity and risk patterns that the operator wants to track.

After scores are developed, the data and risk scores are tracked over time, step 714. For example, if risks associated with agents are being tracked, the risk model might show changes in the risk associated with each agent over a given period of time. The trends and risk scores within the risk model are captured an analyzed, step 716. Analyzing the trends might include determining the risk factors or characteristics associated with an agent that are contributing to the trend. For example, if the data indicates that increasing risk is associated only with agents in a single country, further tracking might be done only for agents in that country.

As illustrated in FIG. 7, the actions to be taken can include refining rules (i.e., in the rules engines 184) at step 722, remedial action at step 724, such as training, disciplinary action, and re-allocating resources (such as increasing or decreasing the number of agents in a geographical location), and further investigation by the system operator at step 726 (e.g., an on-site audit of an agent and it records to identify specific problems or root causes of risk).

Figure 8:
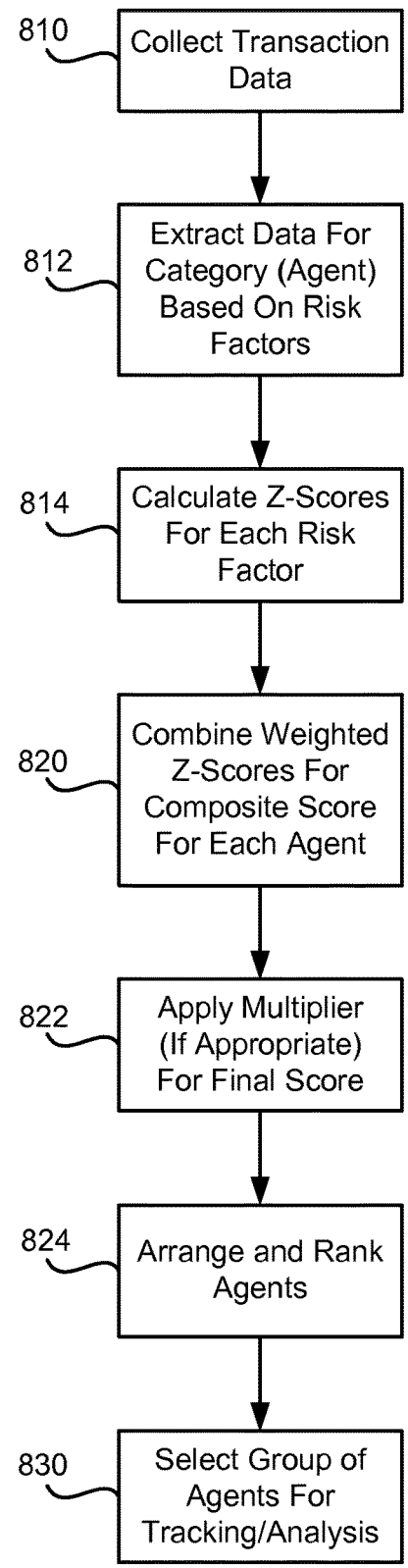
FIG. 8 illustrates a more detailed process for developing a risk model using the risk modeling system seen in FIG. 1.

FIG. 8 illustrates a more detailed exemplary process for developing a risk model using the risk modeling system 190. In the process illustrated, the transaction data category being modeled relates to agents. The process seen in FIG. 8 results in exemplary data shown in FIGS. 9a and 9b.

At step 810, the system 190 collects data from the database 114. At step 812, data for the chosen category (agents) is extracted. A set of risk factors pertaining to agents has been determined, and a Z score is calculated for each of those risk factors, step 814.

Turning briefly to FIGS. 9a and 9b, an exemplary risk model having data for ten agents is shown (Agent 123-Agent 132), with the following seven risk factors (data is taken over a given period of time, such as one year):

SAR'd Transactions (SAR'd Txns)—the number of transactions for the agent that have been included in a "Suspicious Activity Report," which is generated based on information from agents or the system operator that a given transaction appears suspicious because of data entered or circumstances noted during the transaction. These reported activities can sometimes be subjective, based on the judgment of the person or entity reporting, and thus do not necessarily indicate that there has been or their is likely to be any actual fraud or improper activity.

SAR'd Amount—the total amount of the transactions included in the Suspicious Activity Report for the given agent.

Investigation Findings—formal findings of actual fraud or improper activity (typically after an investigation by the operator or an investigator retained by the operator).

Average Send Transaction (Avg Send Txn)—the average value of all transactions in which money is being sent from the agent location.

Average Pay Transaction (Avg Pay Txn)—The average value of all transaction in which money is paid to a recipient at the agent location.

Fraud Complaint Count—the number of fraud complaints received by the operator, and relating to the agent, typically made by a sender or recipient (e.g., a transaction conducted is believed by one of the parties to be fraudulent or improper).

Fraud Complaint Amount—the total value of all transactions that are subject to fraud complaints.

FIGS. 9a and 9b shows exemplary data for each of the seven risk factors, and a Z score for each factor. It should be appreciated that actual risk models might have many more than seven risk factors. FIGS. 10a and 10b are a list of a larger number of risk factors that could be used in developing more extensive risk model for agents.

Returning to FIG. 8, the scores for the various risk factors are combined (after being weighted by the risk modeling system) to yield a composite score for each agent, step 820. The weighting of each Z score would typically be based on the experience of the operator, i.e., based on the operator's experience as to which the factors have the most influence on actual risk. In some embodiments, the weighting might be optional. Composite scores for each agent are illustrated in FIG. 9b. Next, a multiplier might be applied to the composite score in order to produce a final score for each agent, step 822. The multiplier, in the case of agents, might be based on location, with certain geographical locations deemed higher risk than others. The multiplier for each agent (FIG. 9b) is the same, since such agents are all in the same general location (California). It should be understood that in a typical risk model for agent risk, there could be hundreds of thousands of agents around the world. Locations will vary widely and the multiplier used will also vary, particularly if based on geographical location and the determined risk level for such locations.

At step 824, the agents are arranged and ranked according to their risk, as determined by the final score and as illustrated in FIG. 9b (the ten illustrated agents are ranked from "1" to "10"). Finally, at step 830, a group of agents is chosen for tracking. As mentioned above, the typical risk model for agent risk might have risk scores for hundreds of thousands of agents, and such a large number might not be useful to track as a whole. Thus, in one embodiment, only high risk agents that have risk scores more than one standard deviation away from the mean or average risk score would be tracked to analyze trends, since these agents probably conduct transactions where risk is most likely to increase and to be usefully observed over time, and if low risk agents should evolve into higher risk agents over time (their individual risk scores increase to more than one standard deviation away from the mean or average), they could be added to the group to be tracked. In alternative embodiments, agents in a top tier percentage of risk (say, highest 1%, 2% or 5%) could be tracked to analyze trends.

As mentioned earlier in conjunction with FIG. 7, one action that might be taken based on tracking and analyzing trends in the risk scores would be the refinement of rules in the rules engines 184. In one embodiment, such action would be taken automatically by risk modeling system 190, based on the ranking of agents in the process of FIG. 8. As an exemplary illustration, assume that the rules engines (and in particular risk assessment engine 322) maintains six rules (among many others). The six rules and the agent tiers they would apply to are as follows:

| Rule | Agents to Whom Rule is Applied |
| --- | --- |
| Rule 1—Agent must enter a government ID number for all transactions | Top 5% |
| Rule 2—Agent may not collect more than $10,000 in funds per day from all senders | Top 5% |
| Rule 3—Agent must collect social security number for any transaction over $2,000 | Top 30% |
| Rule 4—Agent must obtain date of birth of sender for any transaction over $500 | Top 20% |
| Rule 5—Agent must photocopy and retain ID provided by sender | Top 20% |
| Rule 6—Agent must interview sender and inquire as source of funds, and as to relationship of sender to recipient (and record same) | Top 5% |

As a risk model (such as the one illustrated in FIGS. 9a and 9b) is built and tracked over time, agent rankings (based on updated Z scores) will automatically determine which rules will be applied. If an agent moves from a lower tier into the top 5% (i.e., the highest risk agents), Rules 1, 2 and 6 will thereafter be applied to that agent by the risk assessment engine 322. If an agent moves into the top 20%, Rules 4 and 5 will thereafter be applied to that agent. If an agent moves into the top 30%, Rule 3 will thereafter be applied.

It should be appreciated that the foregoing is just one example of rules that could be applied, and the process and logic for applying them. Among other things, the application of rules based on perceived agent risk level could be considered in the context of the time over which an agent's risk level is increasing. For example, an agent in the lowest 5% of risk scores might suddenly move to the top 50%. While that position (top 50%) might not normally cause additional rules to be applied, the suddenness of the increase in risk might be used by the risk modeling system to cause various new (higher risk) rules to apply.

Figure 11:
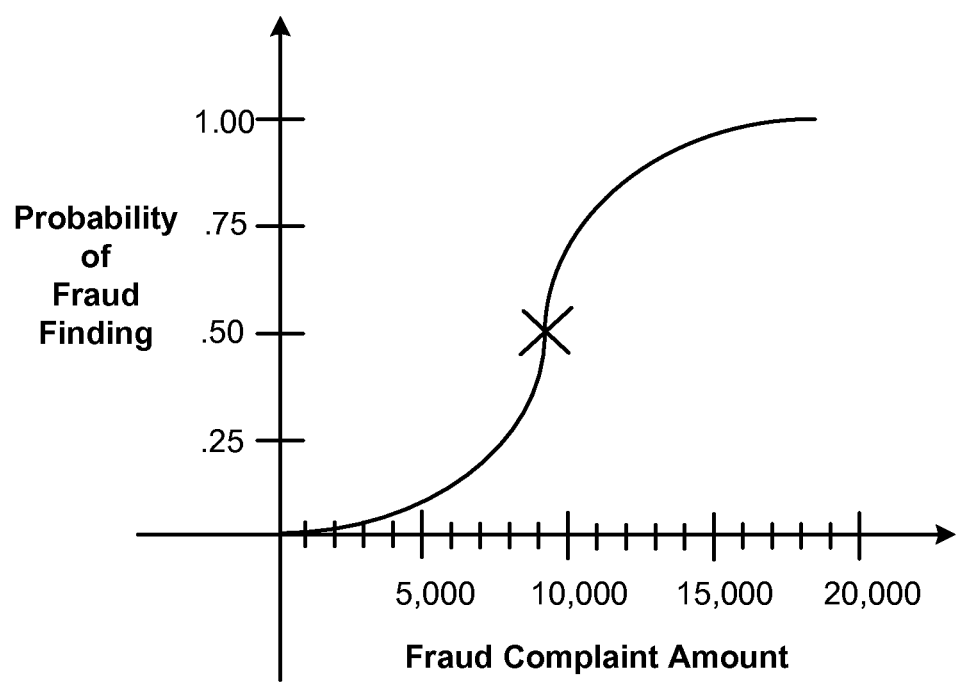
FIG. 11 is a graph illustrating data captured for fraud complaint amounts and probability of fraud risk finding, that could be used in developing a risk model at the risk modeling system seen in FIG. 1.

In some embodiments, a rule could be refined based on changing trends other than the risk scores for an agent. For example, it might be determined by an operator of the system 110 that fraud complaint amounts (the amount of transactions that are subject to a fraud complaints received by the operator) have a direct relationship to the likelihood that actual fraud will likely later be found for a given transaction or agent. Say that the operator has specifically found that when a fraud complaint amount is $9500 or more, the probability of a subsequent finding of actual fraud for that transaction is 50%. Such a circumstance is illustrated by the graph of FIG. 11, where the relationship between fraud complaint amount and the probability of a fraud finding is illustrated (reflecting actual experience as determined by the operator), with the probability reaching 0.50 (50%) when the amount reaches $9500 as represented by an "X" on the graph. As a result of this determination, the operator may develop or refine a rule that might require that the rules engines automatically dictate certain actions (e.g., requiring a hold on the transaction) whenever a transaction for a given agent is at or above $9500. As can be seen, the analysis of data (such as that seen in FIG. 11) is useful in constructing a predictive risk model (predicting risk based on analysis of past trends), and particularly useful when multiple risk factors are considered when analyzing data from past transactions, and such analysis reveals data points in the multiple risk factors which together strongly predict fraud. As should be apparent from earlier description, such predictive modeling can also be made useful by using Z scores for the various risk factors and combining those Z scores into a composite score. (i.e., automatically refining rules to require certain actions when an updated Z score reaches a certain threshold level).

Figure 12:
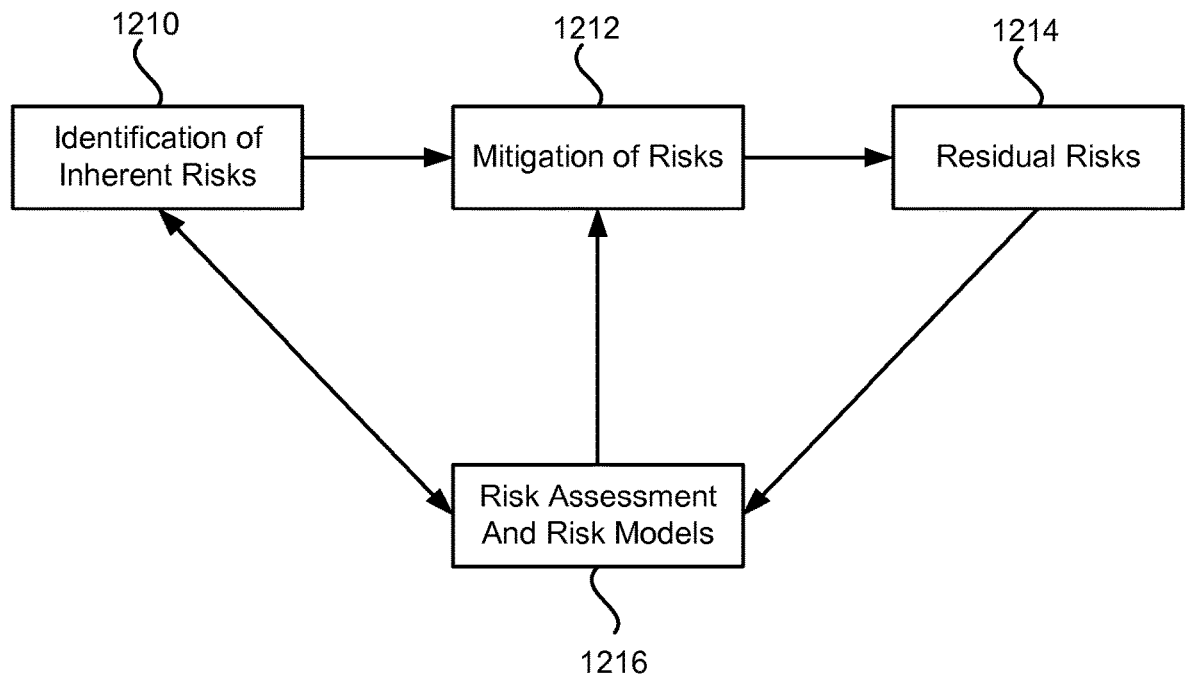
FIG. 12 is a block diagram illustrating the risk assessment system and risk modeling system as part of a feedback process for continually developing and refining rules to identify and mitigate risks associated with money transfer transactions.

FIG. 12 illustrates the use of the risk assessment system 180 and the risk modeling system 190 as part of a feedback process for continually developing and refining rules to identify and mitigate risks. As illustrated, at block 1210 certain risks inherent to money transfer transactions are identified, prior to applying risk assessment and refining risk rules. The inherent risks could be identified by the experiences of the money transfer system operator, by analysis of generally understood risks (apart for actual transaction data), and by law enforcement agencies (e.g., as to individuals and entities likely to engage in fraud or other criminal behaviors). These identified risks are subject to mitigation at block 1212, such as by identifying certain transactions that will not be processed, investigating transactions that appear suspicious (to uncover fraud), remedial actions with agents (e.g., training and resource re-allocation) and other techniques. After mitigation of risk, residual risks may still exist at block 1214 (risks are unlikely to be fully removed by simply identifying and mitigating inherent risks). Residual risk (and data concerning transactions that may have residual risks) are provided to the risk assessment system 180 (as part of risk assessment of current transactions) and risk modeling system 190 (in order to develop rules based on past transactions), block 1216. In addition, knowledge concerning inherent risks (from block 1210) are provided to both systems 180 and 190 at block 1216. During both the assessment of risks (from evaluating the risk of current transactions at risk assessment system 180) and the use of risk models (at risk modeling system 190), feedback is provided for both further indentifying inherent risks (at block 1210) and providing actions that might be used to mitigate risks (at block 1212). The feedback is continuous so that, as described earlier, risk continues to be identified and mitigated as risk models score various parties and transactions, and as new transactions are evaluated at the risk assessment system, to take into account changing patterns of transactions and changing patterns of fraud and criminal behavior.

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention.

Moreover, while the various flows and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Further, the term "exemplary" used herein does not mean that the described example is preferred or better than other examples.

Consequently, although the invention has been described with respect to exemplary embodiments, it will be appreciated that the invention is intended to cover all modifications and equivalents within the scope of the following claims.

What is claimed is:

1. A method for refining rules in a memory associated with a business logic engine of a host system, the rules for use in authorizing activity associated with online transactions, the method comprising:
   receiving, by a normalization engine of the host system, a first transaction, the first transaction including first data associated with a risk factor relating to a first entity, wherein the risk factor is associated with an attribute of one or more transactions and the first transaction is received from a device connected with the host system via a network connection;
   receiving, by said normalization engine of the host system, a second transaction including second data associated with the risk factor, wherein the second transaction is received from said device connected with the host system via the network connection;
   normalizing, by a data normalization engine of the host system, the first data and the second data;
   aggregating, by a data aggregation engine of the host system, the normalized first data and the normalized second data;
   assigning, by a risk assessment engine of the host system, an updated risk score to the risk factor based on the first data and second data, wherein the updated risk score indicates if a risk factor indicates improper activity associated with a transaction; and
   using, by the risk assessment engine of the host system, the updated risk score to refine a first rule in the memory associated the business logic engine of the host system, wherein the updated risk score assigned to the risk factor based on the normalized first data and the normalized second data comprises:
   calculating, by the risk assessment engine of the host system, a Z score for the risk factor, based on the formula:

$$Z = \frac{\chi - \mu}{\sigma}$$

wherein Z is the Z score;
   wherein $\chi$ is a value for the risk factor;
   wherein $\mu$ is a mean of values for a same risk factor for a population of first entities; and
   wherein $\sigma$ is a standard deviation of values for the same risk factor for the population of first entities;
   receiving, by the risk assessment engine of the host system, a third transaction;
   comparing, by the risk assessment engine of the host system, one or more aspects of the third transactions to first rule in the memory associated with the business logic engine of the host system; and
   causing, by the risk assessment engine, the third transaction to be denied based on the first rule in the memory associated with the business logic engine of the host system.

2. The method of claim 1, further comprising:
   assigning, by the business logic engine of the host system, a threshold value related to the risk score at which the first one rule will be automatically refined; and
   tracking, by the host system, the updated risk score, and when threshold value is reached for the updated risk score, automatically refining the at least one rule.

3. The method of claim 1, wherein using the updated risk score to refine the first rule comprises:
   based on the updated risk score, conducting an investigation of completed online transactions to determine if there is an actual improper activity in connection with the online transactions; and
   refining the first rule based on the outcome of the investigation.

4. A system for refining rules in a memory associated with a business logic engine of a host machine, the rules for use in authorizing activity associated with online transactions, the system comprising:
   a computer-readable memory having stored therein a sequence of instructions;
   one or more components of the host system, for executing the sequence of instructions to cause the host system to to refine rules by:
      receiving, by a normalization engine of the host system, a first transaction, the first transaction including first data associated with a risk factor relating to a first entity, wherein the risk factor is associated with an attribute of one or more transactions and the first transaction is received from a device connected with the host system via a network connection;
      receiving, by said normalization engine of the host system, a second transaction including second data associated with the risk factor, wherein the second transaction is received from said device connected with the host system via the network connection;

normalizing, by a data normalization engine of the host system, the first data and the second data;
aggregating, by a data aggregation engine of the host system, the normalized first data and the normalized second data;
assigning, by a risk assessment engine of the host system, an updated risk score to the risk factor based on the normalized first data and normalized second data, wherein the updated risk score indicates if a risk factor indicates improper activity associated with said transaction; and
using, by the risk assessment engine of the host system, the updated risk score to refine rule in the memory associated with the business logic engine of the host system, wherein the updated risk score assigned to the risk factor based on the normalized first data and normalized second data comprises:
a Z score calculated for the risk factor, based on a formula:

$$Z = \frac{\chi - \mu}{\sigma}$$

wherein Z is the Z score;
wherein $\chi$ is a value for the risk factor;
wherein $\mu$ is a mean of values for the same risk factor for a population of first entities; and
wherein $\sigma$ is a standard deviation of values for the same risk factor for the population of first entities;

receiving, by the risk assessment engine of the host system, a third transaction;
comparing, by the risk assessment engine of the host system, one or more aspects of the third transactions to first rule in the memory associated with the business logic engine of the host system; and
causing, by the risk assessment engine, the third transaction to be denied based on the first rule in the memory associated with the business logic engine of the host system.

5. The system of claim 4, wherein the sequence of instructions further cause the processor to refine rules in the rules engine by:
assigning, by the business logic engine of the host system, a threshold value related to the risk score at which the at least one rule will be automatically refined; and
tracking, by the host system, the updated risk score, and when threshold value is reached for the updated risk score, automatically refining the at least one rule.

6. The system of claim 4, wherein using the updated risk score to refine the first rule comprises:
based on the updated risk score, conducting an investigation of completed online transactions to determine if there is an actual improper activity in connection with the online transactions; and
refining the first rule based on the outcome of the investigation.

* * * * *